US008972818B2

(12) United States Patent
Strauss et al.

(10) Patent No.: US 8,972,818 B2
(45) Date of Patent: Mar. 3, 2015

(54) ALGORITHM FOR OPTIMAL USAGE OF EXTERNAL MEMORY TUNING SEQUENCE

(71) Applicant: QUALCOMM Incorporated, San Diego, CA (US)

(72) Inventors: Nir Strauss, Haifa (IL); Racheli Angel Manor, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/672,693

(22) Filed: Nov. 8, 2012

(65) Prior Publication Data
US 2014/0101511 A1 Apr. 10, 2014

Related U.S. Application Data (60) Provisional application No. 61/710,639, filed on Oct. 5, 2012.

(51) Int. Cl.
H03M 13/00 (2006.01)

(52) U.S. Cl.
USPC .......................................... 714/758; 714/764

(58) Field of Classification Search
CPC ............................... G06F 11/221; G06F 11/26
USPC ....... 700/42; 713/503, 400; 711/115; 455/77; 375/226; 714/800, 703, 773, 758, 764
See application file for complete search history.

(56) References Cited

U.S. PATENT DOCUMENTS

| 4,669,040 | A * | 5/1987 | Pettit et al. ...................... 700/42 |
| 8,286,024 | B2 * | 10/2012 | Fujimoto ...................... 713/503 |
| 2008/0098142 | A1 | 4/2008 | Fujimoto |
| 2009/0106460 | A1 | 4/2009 | Suenaga et al. |
| 2010/0023678 | A1 | 1/2010 | Nakanishi et al. |
| 2010/0131832 | A1 | 5/2010 | Cooper |
| 2010/0169699 | A1 | 7/2010 | Fujimoto |
| 2010/0174866 | A1 * | 7/2010 | Fujimoto et al. ............... 711/115 |
| 2012/0079338 | A1 | 3/2012 | Fujimoto |
| 2012/0295554 | A1 * | 11/2012 | Greene et al. .................... 455/77 |
| 2013/0019119 | A1 * | 1/2013 | Fujimoto ...................... 713/400 |
| 2013/0070829 | A1 * | 3/2013 | Lin et al. ........................ 375/226 |

FOREIGN PATENT DOCUMENTS

WO WO-0129680 A1 4/2001

OTHER PUBLICATIONS

International Search Report and Written Opinion—PCT/US2013/063319—ISA/EPO—Dec. 6, 2013.

(Continued)

Primary Examiner — David Ton
(74) Attorney, Agent, or Firm — Howard Seo (57) ABSTRACT

A method, an apparatus, and a computer program product for optimally tuning a memory card in a host device are provided. The apparatus determines at least one tuning parameter associated with the memory card, initiates a reading operation with the memory card, and sends a tuning command to the memory card based on the at least one tuning parameter. The at least one tuning parameter includes a temperature of the memory card, a time elapsed since a last tuning sequence was performed, a number of data blocks sent from the memory card to the host device, and/or a number of transactions between the memory card and the host device. The apparatus also reads data from the memory card, detects a cyclic redundancy check (CRC) error associated with the read data, and sends the tuning command to the memory card upon detecting the CRC error.

20 Claims, 4 Drawing Sheets

(56) References Cited

OTHER PUBLICATIONS

SD Card Association: "SD Specifications Part 1 Physical Layer Simplified Specification," Technical Committee SD Card Association, V.3.01, May 18, 2010, XP055089777, Retrieved from the Internet: URL:https://www.sdcard.org/downloads/pls/simplified_specs/archive/part1_301.pdf [retrieved on Nov. 22, 2013], pp. 1-141.

* cited by examiner

ALGORITHM FOR OPTIMAL USAGE OF EXTERNAL MEMORY TUNING SEQUENCE

CROSS-REFERENCE TO RELATED APPLICATION(S)

This application claims the benefit of U.S. Provisional Application Ser. No. 61/710,639, entitled "ALGORITHM FOR OPTIMAL USAGE OF SD CARD TUNING SEQUENCE USING CMD19 TUNING COMMAND" and filed on Oct. 5, 2012, which is expressly incorporated by reference herein in its entirety.

BACKGROUND

1. Field

The present disclosure relates generally to communication systems, and more particularly, to optimally using a memory card tuning sequence using a CMD 19 tuning command.

2. Background

Secure Digital (SD) is a type of non-volatile (e.g., flash) memory card format developed for use in portable devices, such as cellular phones, smart phones, laptop computers, personal digital assistants (PDAs), global positioning system (GPS) devices, multimedia devices, video devices, digital audio players (e.g., MP3 players), cameras, game consoles, tablet computers, or any other similar functioning devices. For example, an SD memory card may be used by a digital camera to store and retrieve photos. The portable device, also referred to as a host, writes and reads data to and from the SD memory card where the impetus for the reading comes from the host and not from the SD memory card.

Limitations and disadvantages of conventional and traditional approaches will become apparent to one of skill in the art, through comparison of such systems with some aspects of the present invention as set forth in the remainder of the present disclosure with reference to the drawings.

SUMMARY

In an aspect of the disclosure, a method, a computer program product, and an apparatus for optimally tuning a memory card in a host device are provided. The apparatus determines at least one tuning parameter associated with the memory card, initiates a reading operation with the memory card, and sends a tuning command to the memory card based on the at least one tuning parameter. The at least one tuning parameter includes a temperature of the memory card, a time elapsed since a last tuning sequence was performed, a number of data blocks sent from the memory card to the host device, and/or a number of transactions between the memory card and the host device. The apparatus also reads data from the memory card, detects a cyclic redundancy check (CRC) error associated with the read data, and sends the tuning command to the memory card upon detecting the CRC error.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of memory systems (e.g., Secure Digital (SD) or embedded Multi Media Card (eMMC) systems) will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 1:
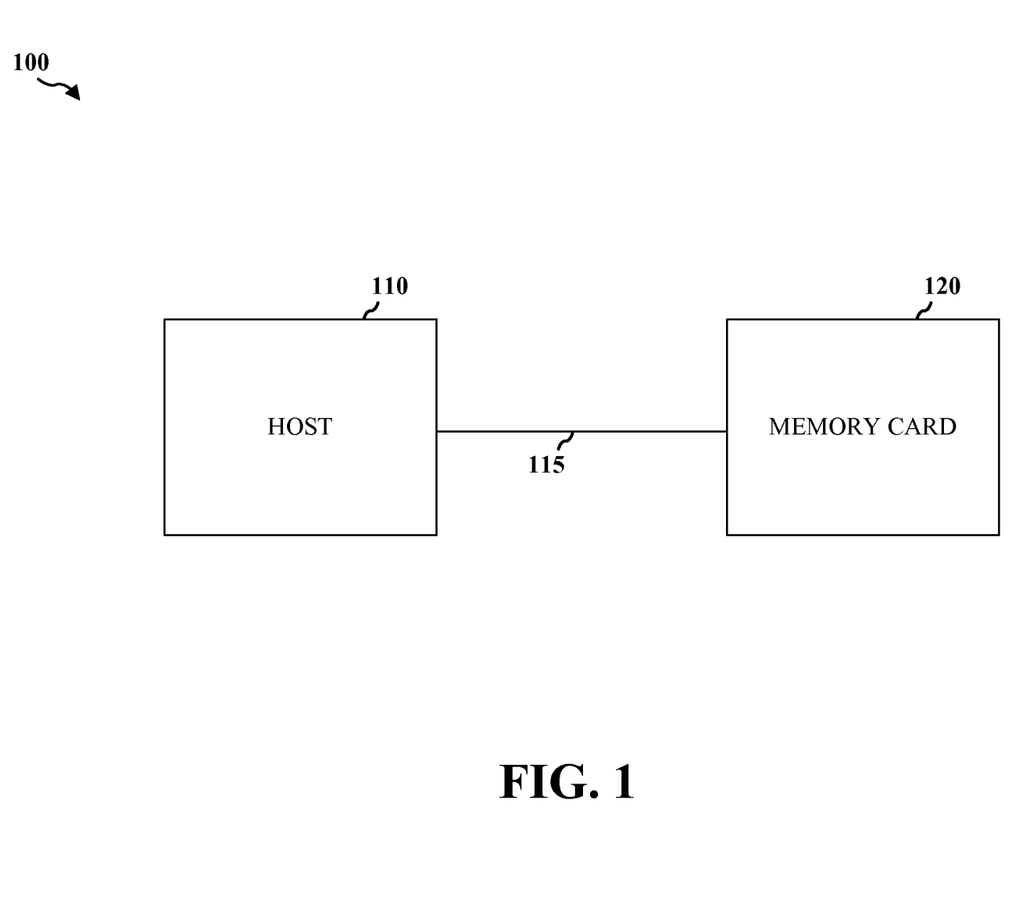
FIG. 1 is a diagram illustrating an electronic storage medium connected to a host device.

FIG. 1 is a diagram 100 illustrating an electronic storage medium/memory card (e.g., Secure Digital (SD) memory card or embedded Multi Media Card (eMMC)) 120 connected to a host device (e.g., mobile phone, tablet, or other electronic device) 110 over a connection 115. In an aspect, when the memory card 120 is connected to (e.g., inserted into) the host device 110, the host device 110 needs to determine an ideal sampling point of the memory card 120 to optimally perform various operations associated with the card. The host device 110 may determine the ideal sampling point by performing a tuning sequence, wherein the host device 110 sends a tuning command to the memory card 120, and in return, the memory card 120 sends a tuning pattern to the host device 110. Based on the tuning pattern, the host device 110 may determine the ideal sampling point.

According to one approach, the host device 110 may perform the tuning sequence only upon initial card detection. According to another approach, an auto-tuning command is supported, wherein the memory card 120 sends a tuning sequence to the host device 110 each time a host controller switch of the host device 110 requests data from the memory card 120. However, the estimated overhead of initiating the tuning sequence for each receiving transaction severely impacts power, latency, etc., and does not add much value in regular operations.

With the advancement and adoption of a faster memory card bus interface, a current maximum clock may be set to 208 MHz or above. Accordingly, a host controller of the host device 110 may be required to adjust a data read sampling point due to specific card delay characteristics, thermal changes, and other factors which impact the sampling point. Because the memory card 120 does not have its own clock, and data is transmitted back to the host device 110 based on an incoming CLK, a round-trip delay should be factored into the host sampling mechanism.

Memory card specifications, such as SD specifications, define a procedure for finding the current optimal sampling point. However, the specifications do not address when this procedure should be repeated as result of thermal changes, ware-leveling, block count, etc. Tuning may be performed for each read transaction, but the negative impact on power, latency and performance is significant. A current tuning sequence may take up to 150 msec, but does not include any host processing time, which can further extend the sequence. Accordingly, the present disclosure aims to take advantage of additional data available to the host device 110 to optimally use a tuning command for adjusting a host sampling clock (e.g., CMD19 tuning command) when performing a tuning operation.

In an aspect, the present disclosure improves the operational performance of memory cards which support Ultra High Speed-I (UHS-I) and/or Ultra High Speed-II (UHS-II) speed classes and a CMD19 tuning command for adjusting a host sampling clock. An algorithm is provided for using the CMD19 tuning command in an optimal manner to maintain a correct delay line phase and minimize a number of tuning sequences needed. This preserves power, improves a user's experience, and improves performance of the host device.

An adaptive algorithm is provided that will use one or more parameters to decide whether performing the tuning sequence is necessary. The algorithm will evaluate criteria, such as: 1) card temperature; 2) time elapsed since a last tuning sequence; 3) number of blocks read from the card; 4) cyclic redundancy check (CRC) error occurrences; and 5) number of transactions over a pre-defined window. Other various criteria may also be evaluated. Using the criteria, the host device 110 may determine if a new tuning sequence should be initiated.

The algorithm is adaptive in terms of the parameters it may include in the decision criteria. Also, the algorithm may be performed during normal operations. In addition, the algorithm may remedy the CRC errors by performing the tuning sequence and notifying the host controller switch of the host device 110.

Figure 2:
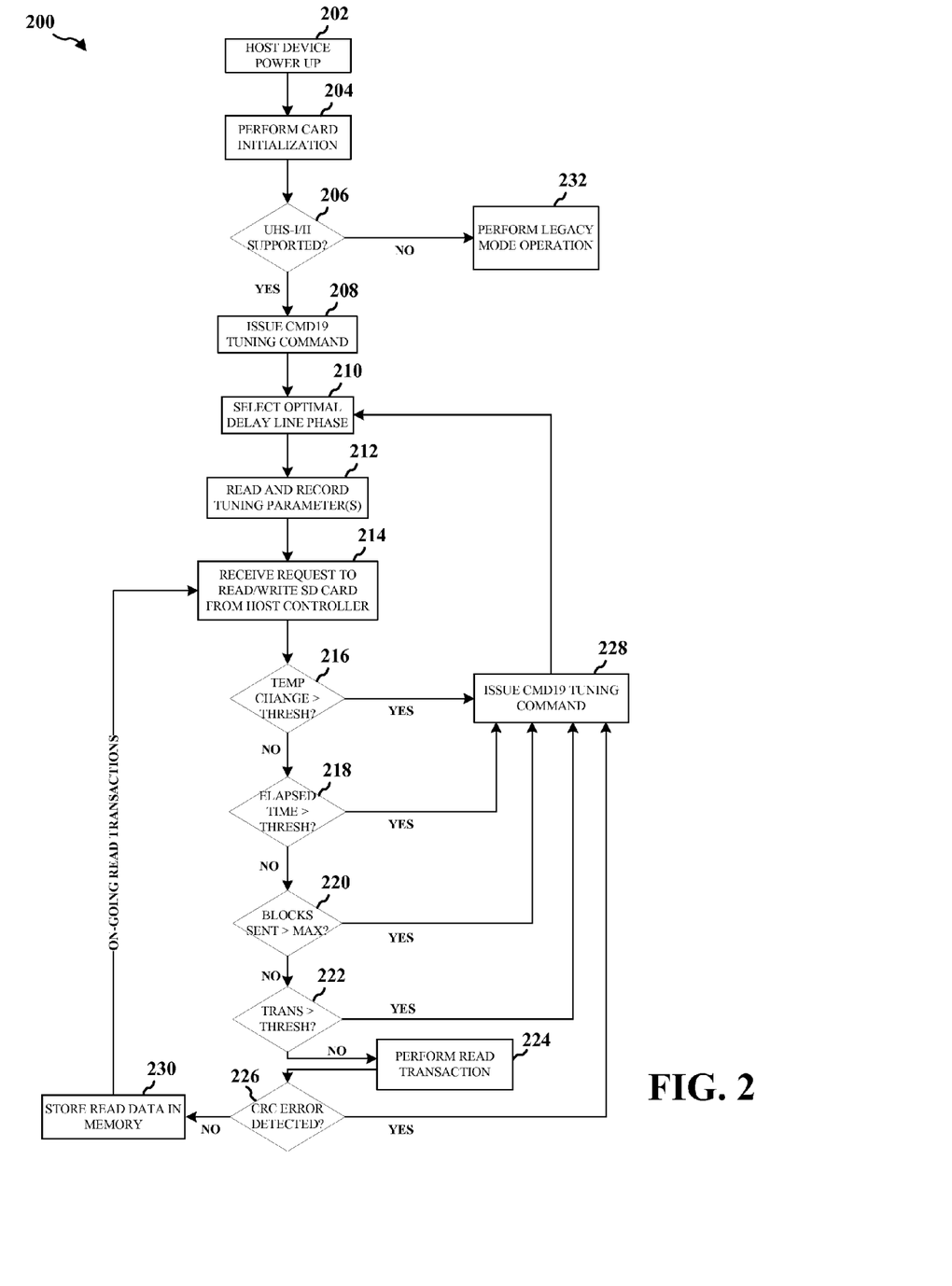
FIG. 2 is a flow chart of a method for optimally tuning a memory card in a host device.

FIG. 2 is a flow chart 200 of a method for optimally tuning a memory card in a host device. The memory card may be an SD card or an eMMC, for example. The method may be performed by the host device. At step 202, the host device powers up (i.e., activates) to become operational. At step 204, the host device initializes a memory card inserted into (connected to) the host device.

At step 206, the host device determines whether the memory card supports a particular speed class, such as UHS-I and/or UHS-II. When the host device determines that the memory card does not support UHS-I and/or UHS-II, the host device proceeds to step 232 and performs a legacy mode operation with respect to the memory card. The legacy mode operation may be characterized by a low clock frequency, and may not involve a tuning sequence.

At step 208, when the host device determines that the memory card supports UHS-I and/or UHS-II, the host device issues (sends) a tuning command to the memory card. The tuning command may be a CMD19 tuning command. In return, the memory card may send a tuning pattern to the host device. At step 210, based on the tuning pattern, the host device may select an optimal delay line phase for performing various operations associated with the memory card.

At step 212, the host device may determine and record one or more tuning parameters associated with the memory card. The tuning parameters may include a temperature of the memory card, a time elapsed since a last tuning sequence was performed, a number of data blocks sent from the memory card to the host device, and/or a number of transactions between the memory card and the host device.

At step 214, the host device initiates a reading/writing operation with the memory card. The reading/writing operation may be initiated upon receiving a request from a host controller of the host device. Thereafter, the host device may determine to send a tuning command to the memory card based on the one or more tuning parameters.

For example, at step 216, the host device determines whether a change in the temperature of the memory card is greater than a predetermined threshold. If greater than the predetermined threshold, the host device sends the tuning command to the memory card at step 228.

In another example, at step 218, the host device determines whether the time elapsed since the last tuning sequence was performed is greater than a maximum time. If greater than the maximum time, the host device sends the tuning command to the memory card at step 228.

In a further example, at step 220, the host device determines whether the number of data blocks sent from the memory card to the host device is greater than a maximum block count. If greater than the maximum block count, the host device sends the tuning command to the memory card at step 228.

In another example, at step 222, the host device determines whether the number of transactions between the memory card and the host device over a pre-defined window is greater than a predetermined threshold. If greater than the predetermined threshold, the host device sends the tuning command to the memory card at step 228.

At step 224, if none of the determinations at steps 216, 218, 220, and/or 222 regarding the tuning parameters have a positive outcome, the host device may read data from the memory card. At step 226, the host device may determine whether a cyclic redundancy check (CRC) error associated with the read data is detected. If the CRC error is detected, the host device sends the tuning command to the memory card at step 228. At step 230, if the CRC error is not detected, the host device may store the read data in memory.

As stated above, the tuning command may be a CMD19 tuning command. After the host device sends the CMD19 tuning command to the memory card at step 228, the memory card may return a tuning pattern to the host device. Based on the tuning pattern, the host device may determine an ideal sampling point of the memory card (step 210), wherein the ideal sampling point allows the host device to optimally perform various operations associated with the memory card.

Figure 3:
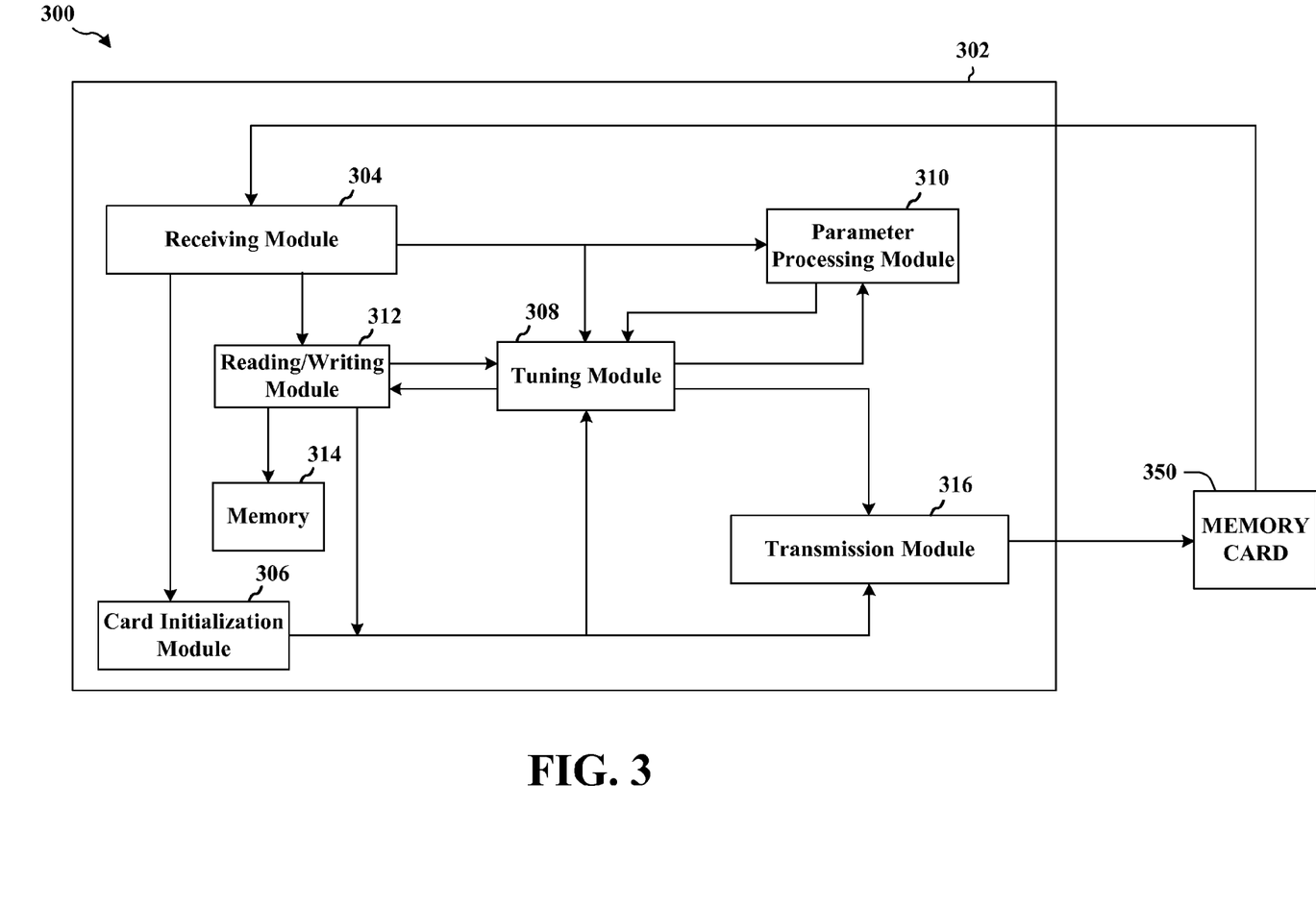
FIG. 3 is a conceptual data flow diagram illustrating the data flow between different modules/means/components in an exemplary apparatus.

FIG. 3 is a conceptual data flow diagram 300 illustrating the data flow between different modules/means/components in an exemplary apparatus 302. The apparatus may be a host device. The apparatus includes a receiving module 304, a card initialization module 306, a tuning module 308, a parameter processing module 310, a reading/writing module 312, a memory 314, and a transmission module 316.

When the apparatus 302 powers up (i.e., activates) to become operational, the card initialization module 306 initializes a memory card 350 inserted into (connected to) the apparatus 302. The memory card 350 may be an SD card or an eMMC, for example. The card initialization module 306 may determine whether the memory card 350 supports a particular speed class, such as UHS-I and/or UHS-II. When the card initialization module 306 determines that the memory card 350 does not support UHS-I and/or UHS-II, the card initialization module 306 may instruct the apparatus 302 to perform a legacy mode operation with respect to the memory card 350. The legacy mode operation may be characterized by a low clock frequency, and may not involve a tuning sequence.

When the card initialization module 306 determines that the memory card 350 supports UHS-I and/or UHS-II, the tuning module 308 issues (sends) a tuning command (via the transmission module 316) to the memory card 350. The tuning command may be a CMD19 tuning command. In return, the tuning module 308 may receive a tuning pattern (via the receiving module 304) from the memory card 350. Based on the tuning pattern, the tuning module 308 may select an optimal delay line phase for performing various operations associated with the memory card 350.

The parameter processing module 310 may determine and record one or more tuning parameters associated with the memory card 350. The tuning parameters may include a temperature of the memory card 350, a time elapsed since a last tuning sequence was performed, a number of data blocks sent from the memory card 350 to the apparatus 302, and/or a number of transactions between the memory card 350 and the apparatus 302.

The reading/writing module 312 may initiate a reading/writing operation with the memory card 350. The reading/writing operation may be initiated upon receiving a request from a host controller of the apparatus 302. Thereafter, the tuning module 308 may determine to send a tuning command to the memory card 350 based on the one or more tuning parameters.

For example, the tuning module 308 may determine whether a change in the temperature of the memory card 350 is greater than a predetermined threshold. If greater than the predetermined threshold, the tuning module 308 sends the tuning command to the memory card 350.

In another example, the tuning module 308 may determine whether the time elapsed since the last tuning sequence was performed is greater than a maximum time. If greater than the maximum time, the tuning module 308 sends the tuning command to the memory card 350.

In a further example, the tuning module 308 may determine whether the number of data blocks sent from the memory card 350 to the apparatus 302 is greater than a maximum block count. If greater than the maximum block count, the tuning module 308 sends the tuning command to the memory card 350.

In another example, the host device may determine whether the number of transactions between the memory card 350 and the apparatus 302 over a pre-defined window is greater than a predetermined threshold. If greater than the predetermined threshold, the tuning module 308 sends the tuning command to the memory card 350.

If none of the determinations regarding the tuning parameters are affirmatively determined, the reading/writing module 312 may read data from the memory card 350. The reading/writing module 312 may determine whether a cyclic redundancy check (CRC) error associated with the read data is detected. If the reading/writing module 312 detects the CRC error, the tuning module 308 sends the tuning command to the memory card 350. If the reading/writing module 312 does not detect the CRC error, the reading/writing module 312 may store the read data in memory 314.

As stated above, the tuning command may be a CMD19 tuning command. After the tuning module 308 sends the CMD19 tuning command to the memory card 350, the memory card 350 may return a tuning pattern to the apparatus 302. Based on the tuning pattern, the tuning module 308 may determine an ideal sampling point of the memory card 350, wherein the ideal sampling point allows the apparatus 302 to optimally perform various operations associated with the memory card 350.

The apparatus may include additional modules that perform each of the steps of the algorithm in the aforementioned flow chart of FIG. 2. As such, each step in the aforementioned flow chart of FIG. 2 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 4:
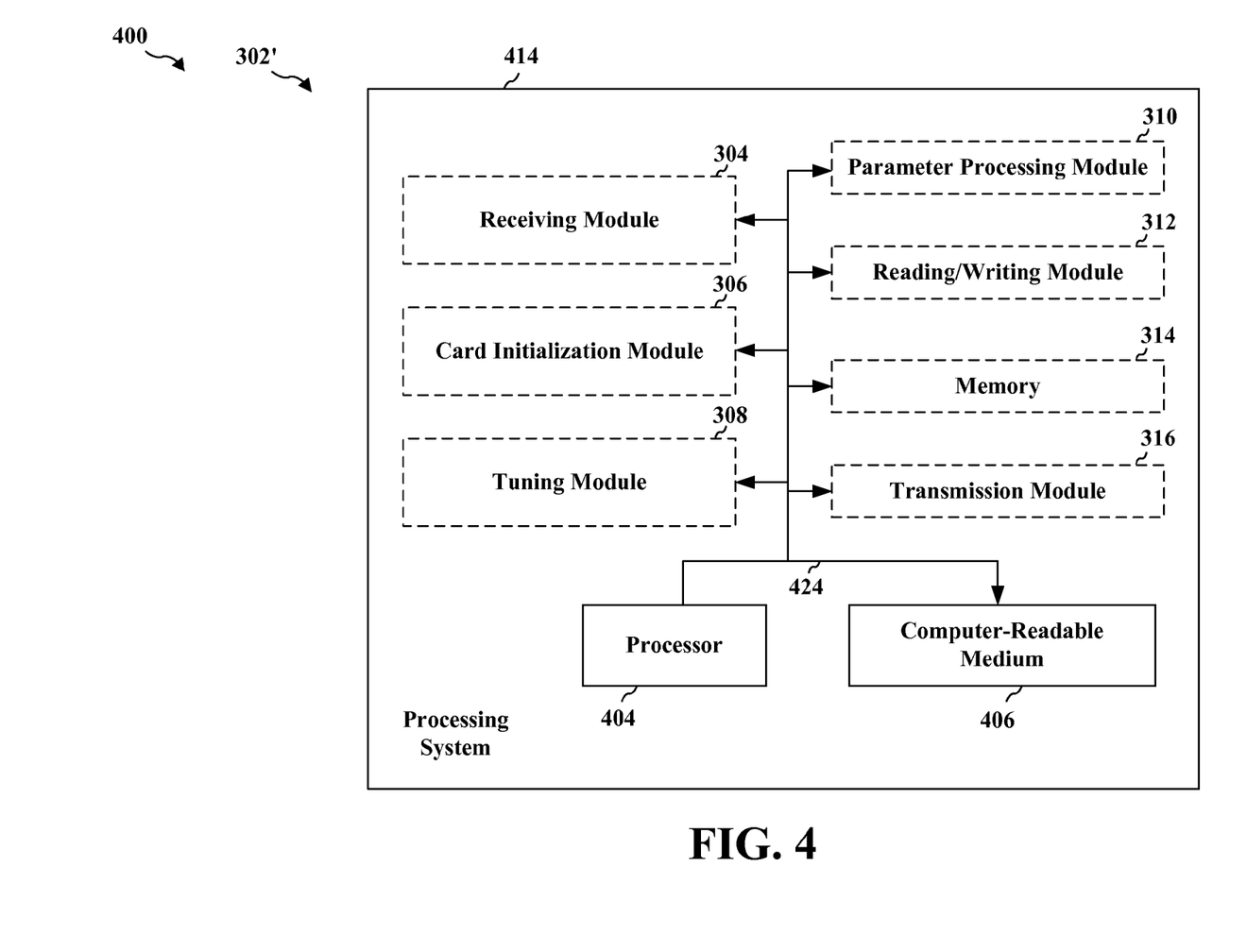
FIG. 4 is a diagram illustrating an example of a hardware implementation for an apparatus employing a processing system.

FIG. 4 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware modules, represented by the processor 404, the modules 304, 306, 308, 310, 312, 314, 316, and the computer-readable medium 406. The bus 424 may also link various other circuits such as timing sources, peripherals, voltage regulators, and power management circuits, which are well known in the art, and therefore, will not be described any further.

The processing system 414 includes a processor 404 coupled to a computer-readable medium 406. The processor 404 is responsible for general processing, including the execution of software stored on the computer-readable medium 406. The software, when executed by the processor 404, causes the processing system 414 to perform the various functions described supra for any particular apparatus. The computer-readable medium 406 may also be used for storing data that is manipulated by the processor 404 when executing software. The processing system further includes at least one of the modules 304, 306, 308, 310, 312, 314, and 316. The modules may be software modules running in the processor 404, resident/stored in the computer readable medium 406, one or more hardware modules coupled to the processor 404, or some combination thereof.

In one configuration, the apparatus 302/302' for optimally tuning an memory card in a host device includes means for determining at least one tuning parameter associated with the memory card, means for initiating a reading operation with the memory card, means for sending a tuning command to the memory card based on the at least one tuning parameter, means for reading data from the memory card, means for detecting a cyclic redundancy check (CRC) error associated with the read data, means for sending the tuning command to the memory card upon detecting the CRC error, means for determining that the memory card supports Ultra High Speed (UHS), means for sending the tuning command to the memory card, and means for selecting an optimal delay line phase. The aforementioned means may be one or more of the aforementioned modules of the apparatus 302 and/or the processing system 414 of the apparatus 302' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for optimally tuning a memory card in a host device, comprising:
   determining at least one tuning parameter associated with the memory card, wherein the at least one tuning parameter comprises at least one of:
   a temperature of the memory card,
   a time elapsed since a last tuning sequence was performed,
   a number of data blocks sent from the memory card to the host device, or
   a number of transactions between the memory card and the host device;
   initiating a reading operation with the memory card; and
   sending a tuning command to the memory card based on the at least one tuning parameter.

2. The method of claim 1, wherein the sending the tuning command to the memory card based on the at least one tuning parameter comprises sending the tuning command to the memory card when:
   a change in the temperature of the memory card is greater than a predetermined threshold;
   the time elapsed since the last tuning sequence was performed is greater than a maximum time;
   the number of data blocks sent from the memory card to the host device is greater than a maximum block count; or
   the number of transactions between the memory card and the host device over a pre-defined window is greater than a predetermined threshold.

3. The method of claim 1, further comprising:
   reading data from the memory card;
   detecting a cyclic redundancy check (CRC) error associated with the read data; and
   sending the tuning command to the memory card upon detecting the CRC error.

4. The method of claim 1, prior to the determining the at least one tuning parameter associated with the memory card, the method further comprising:
   determining that the memory card supports Ultra High Speed (UHS);
   sending the tuning command to the memory card; and
   selecting an optimal delay line phase.

5. The method of claim 1, wherein the tuning command is a CMD19 tuning command.

6. An apparatus for optimally tuning a memory card in a host device, comprising:
   means for determining at least one tuning parameter associated with the memory card, wherein the at least one tuning parameter comprises at least one of:
   a temperature of the memory card,
   a time elapsed since a last tuning sequence was performed,
   a number of data blocks sent from the memory card to the host device, or
   a number of transactions between the memory card and the host device;
   means for initiating a reading operation with the memory card; and
   means for sending a tuning command to the memory card based on the at least one tuning parameter.

7. The apparatus of claim 6, wherein the means for sending the tuning command to the memory card based on the at least one tuning parameter is configured to send the tuning command to the memory card when:
   a change in the temperature of the memory card is greater than a predetermined threshold;
   the time elapsed since the last tuning sequence was performed is greater than a maximum time;
   the number of data blocks sent from the memory card to the host device is greater than a maximum block count; or
   the number of transactions between the memory card and the host device over a pre-defined window is greater than a predetermined threshold.

8. The apparatus of claim 6, further comprising:
means for reading data from the memory card;
means for detecting a cyclic redundancy check (CRC) error associated with the read data; and
means for sending the tuning command to the memory card upon detecting the CRC error.

9. The apparatus of claim 6, the apparatus further comprising:
means for determining that the memory card supports Ultra High Speed (UHS);
means for sending the tuning command to the memory card; and
means for selecting an optimal delay line phase,
wherein the determining that the memory card supports UHS, the sending the tuning command to the memory card, and the selecting the optimal delay line phase are performed prior to the determining the at least one tuning parameter associated with the memory card.

10. The apparatus of claim 6, wherein the tuning command is a CMD19 tuning command.

11. An apparatus for optimally tuning a memory card in a host device, comprising:
a processing system configured to:
determine at least one tuning parameter associated with the memory card, wherein the at least one tuning parameter comprises at least one of:
a temperature of the memory card,
a time elapsed since a last tuning sequence was performed,
a number of data blocks sent from the memory card to the host device, or
a number of transactions between the memory card and the host device;
initiate a reading operation with the memory card; and
send a tuning command to the memory card based on the at least one tuning parameter.

12. The apparatus of claim 11, wherein the processing system configured to send the tuning command to the memory card based on the at least one tuning parameter is configured to send the tuning command to the memory card when:
a change in the temperature of the memory card is greater than a predetermined threshold;
the time elapsed since the last tuning sequence was performed is greater than a maximum time;
the number of data blocks sent from the memory card to the host device is greater than a maximum block count; or
the number of transactions between the memory card and the host device over a pre-defined window is greater than a predetermined threshold.

13. The apparatus of claim 11, the processing system further configured to:
read data from the memory card;
detect a cyclic redundancy check (CRC) error associated with the read data; and
send the tuning command to the memory card upon detecting the CRC error.

14. The apparatus of claim 11, prior to the processing system determining the at least one tuning parameter associated with the memory card, the processing system further configured to:

determine that the memory card supports Ultra High Speed (UHS);
send the tuning command to the memory card; and
select an optimal delay line phase.

15. The apparatus of claim 11, wherein the tuning command is a CMD19 tuning command.

16. A computer program product for optimally tuning a memory card in a host device, comprising:
a non-transitory computer-readable medium comprising code for:
determining at least one tuning parameter associated with the memory card, wherein the at least one tuning parameter comprises at least one of:
a temperature of the memory card,
a time elapsed since a last tuning sequence was performed,
a number of data blocks sent from the memory card to the host device, or
a number of transactions between the memory card and the host device;
initiating a reading operation with the memory card; and
sending a tuning command to the memory card based on the at least one tuning parameter.

17. The computer program product of claim 16, wherein the code for sending the tuning command to the memory card based on the at least one tuning parameter is configured to send the tuning command to the memory card when:
a change in the temperature of the memory card is greater than a predetermined threshold;
the time elapsed since the last tuning sequence was performed is greater than a maximum time;
the number of data blocks sent from the memory card to the host device is greater than a maximum block count; or
the number of transactions between the memory card and the host device over a pre-defined window is greater than a predetermined threshold.

18. The computer program product of claim 16, the non-transitory computer-readable medium further comprising code for:
reading data from the memory card;
detecting a cyclic redundancy check (CRC) error associated with the read data; and
sending the tuning command to the memory card upon detecting the CRC error.

19. The computer program product of claim 16, the non-transitory computer-readable medium further comprising code for:
determining that the memory card supports Ultra High Speed (UHS);
sending the tuning command to the memory card; and
selecting an optimal delay line phase,
wherein the determining that the memory card supports UHS, the sending the tuning command to the memory card, and the selecting the optimal delay line phase are performed prior to the determining the at least one tuning parameter associated with the memory card.

20. The computer program product of claim 16, wherein the tuning command is a CMD19 tuning command.

* * * * *